United States Patent
Lewis et al.

(10) Patent No.: US 7,819,460 B2
(45) Date of Patent: Oct. 26, 2010

(54) SERVICEABLE FABRIC ASSEMBLY FOR CONVERTIBLE OF A MOTOR VEHICLE

(75) Inventors: Stephen J. Lewis, Harrison Township, MI (US); David A. Smith, Macomb Township, MI (US); Rick H. Troeger, Westminster, CO (US); Stanley V. Spate, Westminster, CO (US); Duane C. Junkin, Madison Heights, MI (US); Keijo J. Huotari, Fenton, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 12/288,240

(22) Filed: Oct. 17, 2008

(65) Prior Publication Data

US 2010/0096879 A1    Apr. 22, 2010

(51) Int. Cl.
*B60J 7/10* (2006.01)
*B60J 7/06* (2006.01)
(52) U.S. Cl. .................... 296/107.11; 296/121; 296/219
(58) Field of Classification Search ................. 296/121, 296/219, 107.11
See application file for complete search history.

(56) References Cited

U.S. PATENT DOCUMENTS

| 1,298,836 | A | * | 4/1919 | Vetter | .......................... 296/135 |
| 5,511,844 | A | * | 4/1996 | Boardman | ............. 296/107.11 |
| 2005/0280293 | A1 | * | 12/2005 | MacNee et al. | ............. 296/219 |

* cited by examiner

*Primary Examiner*—Dennis H Pedder
(74) *Attorney, Agent, or Firm*—Warn Partners, P.C

(57) ABSTRACT

The present invention is a serviceable fabric assembly for a convertible roof of a motor vehicle having a retainer connected to a fabric cover and slidably engaged within a channel formed in a first bow member. The first bow member has an upper panel and a lower panel configured to form the channel substantially along the longitudinal length of the first bow member. The channel is configured to laterally receive a compressible portion of the retainer which prevents the retainer from exiting the channel in a direction transverse to the longitudinal axis of the first bow member. A gap is formed near at least one end of the channel on the outboard side of the channel and is sized such that an operator can slide the retainer out of the channel through the gap for servicing and replacing the fabric cover without having to disassemble the first bow member.

20 Claims, 3 Drawing Sheets

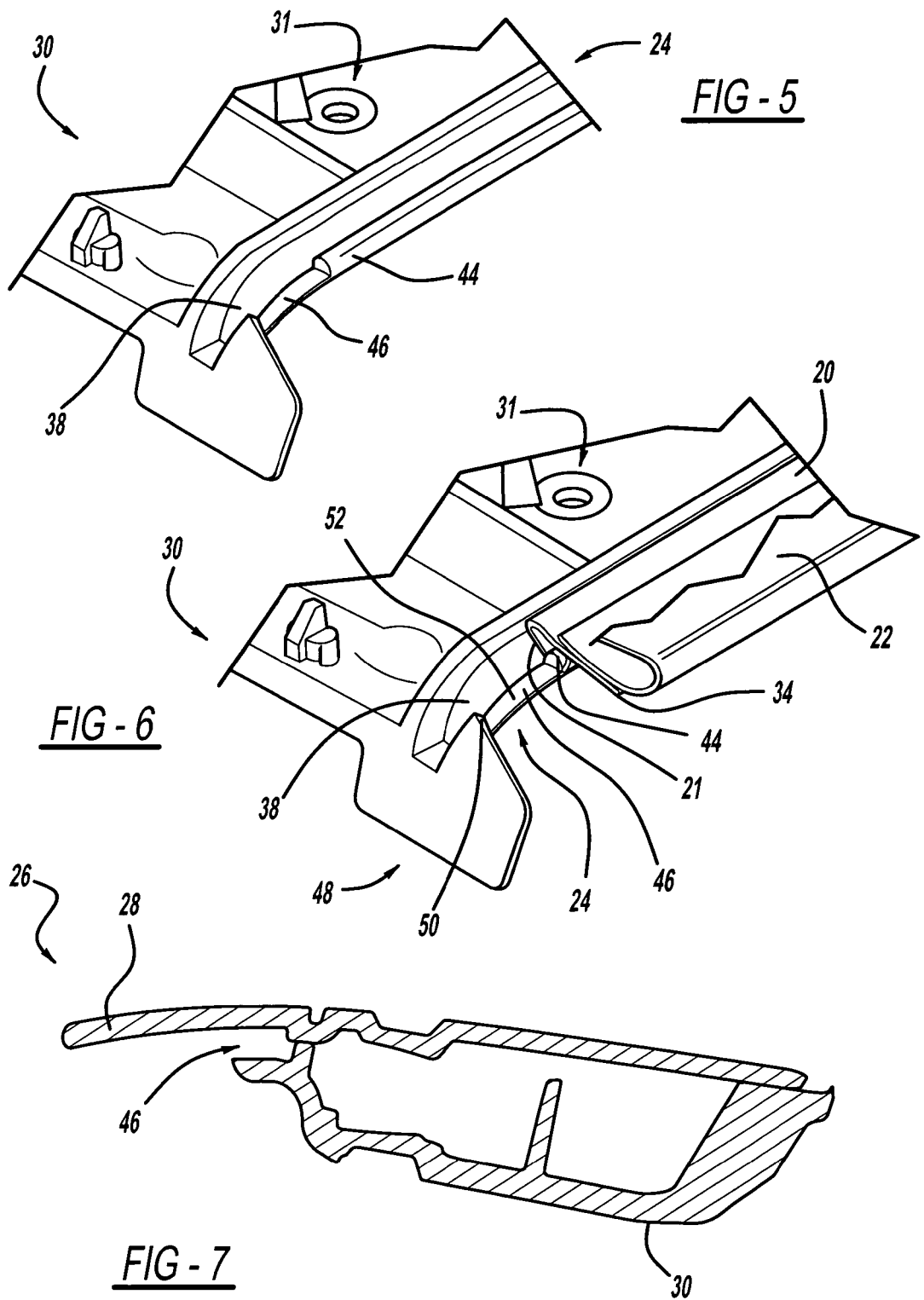

SERVICEABLE FABRIC ASSEMBLY FOR CONVERTIBLE OF A MOTOR VEHICLE

FIELD OF THE INVENTION

The present invention relates to a serviceable fabric assembly for a convertible roof of a motor vehicle and method for using the same.

BACKGROUND OF THE INVENTION

Convertible roofs are generally known and used for a variety of motor vehicles. In some applications it is useful to have a convertible roof that provides a relatively soft top and in other applications a relatively hard top. In general, convertible roofs move between an up or extended position in which the roof covers a passenger compartment and a down or stowed position in which the roof retracts from the passenger compartment into a storage area. Typical soft top convertible roofs have a support frame or structure formed of numerous rigid and semi-rigid support rails, bows, panels, and the like connected to one or more pieces of fabric to form a retractable roof. When the roof is extended to cover the passenger compartment, the foremost roof bow is manually connected by a vehicle operator, e.g., by two or more latches disposed on the bow, to a vehicle frame portion associated with the top of a windshield. The convertible roof thereby creates a weatherproof seal with the frame of the motor vehicle.

One common problem with conventional convertible roofs is that they are inefficient and costly to service since the fabric is fixably connected to the foremost support bow. Thus, if the fabric becomes damaged and requires removal for servicing or otherwise requires replacement, the foremost support bow must be taken apart or dismantled in order to remove the damaged fabric. The foremost support bow must also be reassembled with the repaired or replaced fabric. Thus, assembling and servicing the fabric of conventional convertible roofs is inefficient, costly, and time consuming.

Accordingly, there exists a need for a serviceable fabric assembly configured to attach a fabric cover to a convertible roof while substantially preserving serviceability of the fabric cover.

SUMMARY OF THE INVENTION

The present invention is directed to a serviceable fabric assembly for a convertible roof of a motor vehicle having a retainer connected to a fabric cover and slidably engaged within a channel formed in a first bow member. When the convertible roof is up, the first bow member can be selectively connected to a top of a windshield frame portion of the motor vehicle to form a tight seal with the windshield frame portion. The first bow member has an upper panel connected to a lower panel and is configured to form a channel that extends substantially along the longitudinal length of the first bow member. The channel is generally shaped with a lateral opening having a narrow portion leading to a larger inner cavity. A compressible portion of the retainer is operably configured to enter laterally through the narrower opening and expand in the larger inner cavity. The retainer is thereby prevented from moving laterally back out of the narrower opening. The configuration of the channel and retainer allow the retainer to selectively slide substantially along the longitudinal length of the channel traverse to an axis extending from the narrower opening to the larger inner cavity. A gap or cut out is formed toward at least on end of the channel and is operably sized to allow the retainer to be selectively slid out of the first bow member through the gap. Accordingly, an operator can selectively slide or bias the retainer along the longitudinal length of the channel and remove the retainer from the channel by pulling the retainer out through the gap for servicing and replacing of the fabric cover without having to dismantle the first bow member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a perspective view of a lower panel forming part of a channel having a gap, in accordance with one aspect of the present invention;

FIG. 6 is a perspective view of the lower panel forming part of the channel having a gap, the compressible portion of the retainer located within the channel, and depicting the fabric cover connected to a fabric attachment surface of the retainer, in accordance with one aspect of the present invention; and FIG. 7 is a cross sectional plan view of the serviceable fabric assembly taken along line 7-7 of FIG. 3 depicting a gap associated with the channel, according to the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
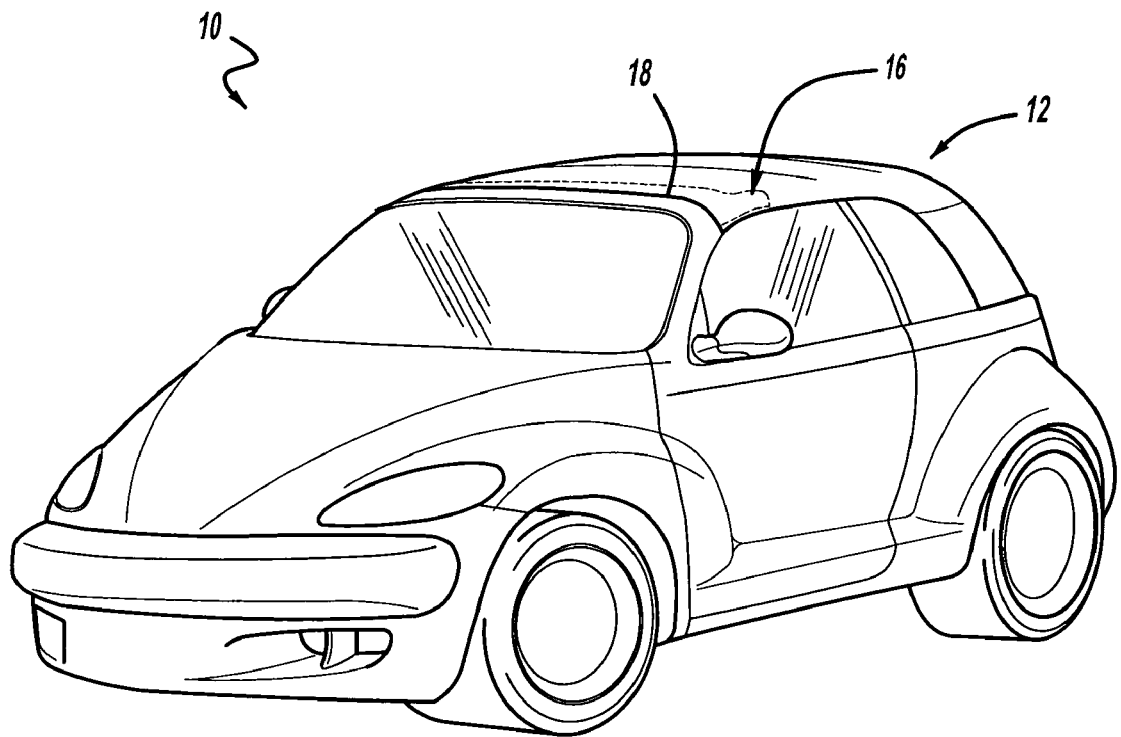
FIG. 1 is a schematic perspective view of a motor vehicle having a convertible roof and depicting a serviceable fabric assembly consistent with the present invention.

FIG. 1 illustrates a perspective view of a motor vehicle 10 having a convertible roof generally shown at 12 with a serviceable fabric assembly of the present invention shown generally at 16. The convertible roof 12 is depicted in the up position such that the convertible roof 12 encloses or covers the passenger compartment and creates a substantially tight waterproof seal with the frame and windows about the periphery of the passenger compartment of the motor vehicle 10. When the convertible roof 12 is extended to the up position, the serviceable fabric assembly 16 has a leading edge that operably interfaces with an upper edge of a windshield frame 18 portion, e.g., the top portion of metal or rigid plastic trim located around the periphery of the windshield glass. In operation, after the convertible roof 12 is extended to the up position, an operator manually attaches the serviceable fabric assembly 16 to the top of the windshield frame 18 by pivoting or rotating two or more latches disposed on the serviceable fabric assembly 16 to engage opposing braces disposed on the windshield frame 18. The serviceable fabric assembly 16 helps to form a tight seal with the top or upward portion of the windshield frame 18 to prevent the egress of environmental elements into the passenger compartment, e.g., rain, wind, dust, and the like elements. It is understood that the serviceable fabric assembly 16 can additionally have a weatherstrip, e.g., formed of pliable rubber and the like, to help create a tighter seal with the windshield frame 18. When the operator desires to retract the convertible roof 12 to the down or stowed position, the operator disengages the two or more latches and can push a switch to automatically retract the convertible roof 12. The serviceable fabric assembly 16 thereby moves generally rearward with the other convertible roof 12 components in the direction of the trunk area and is stowed.

Referring generally to FIGS. 2-7, the serviceable fabric assembly is generally shown at 16 having a retainer 20 connected to a fabric cover 22 and slidably connected to a channel, generally indicated at 24, formed in a first bow member, generally indicated at 26. The first bow member 26 is generally formed of an upper panel 28 operably connected, e.g., by a plurality of heat stakes 29, to a lower panel 30, wherein the first bow member 26 is substantially rigid and operable for providing support generally at the forward most end of the convertible roof 12 adjacent to the top of the windshield frame 18. A front end 32 of the fabric cover 22 is operably connected, e.g., by sewing, gluing, clipping, and the like, to a fabric attachment surface 34 disposed substantially along the longitudinal length of the retainer 20. The retainer 20 is operably configured to be held by the channel 24 which extends substantially along the longitudinal length of the first bow member 26. The retainer 20 and fabric cover 22 are thereby selectively connected to the first bow member 26 substantially along the entire longitudinal length of the first bow member 26.

Figure 2:
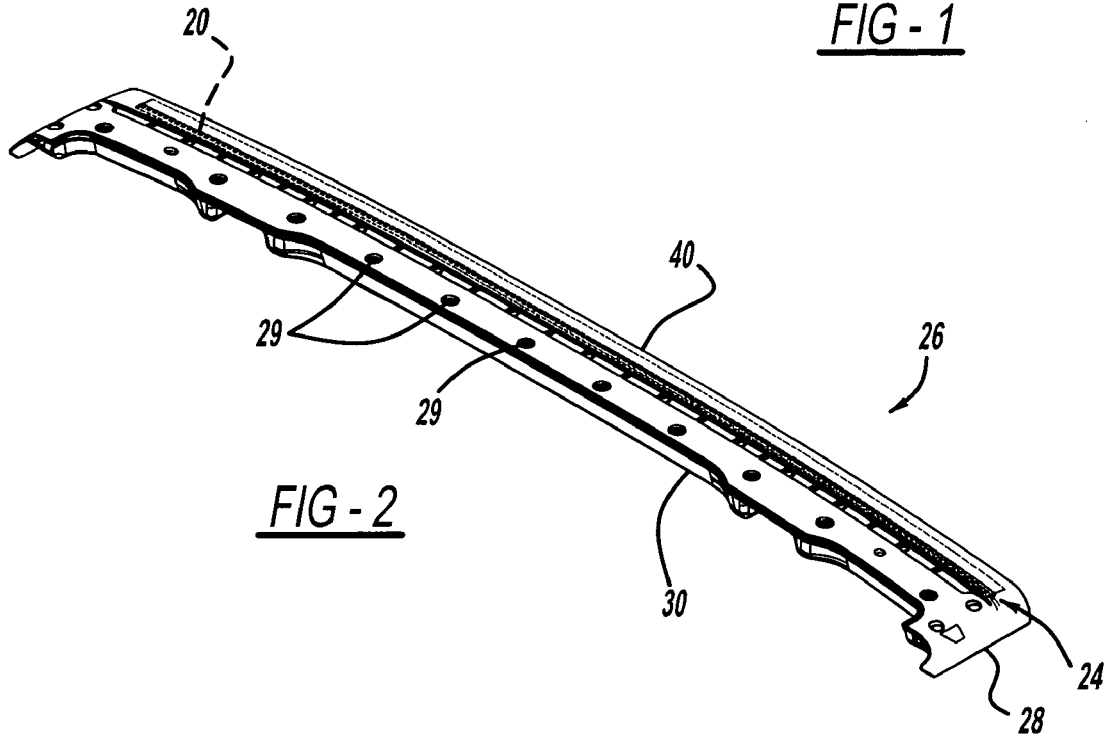
FIG. 2 is a perspective view of a serviceable fabric assembly, according to the present invention.
Figure 3:
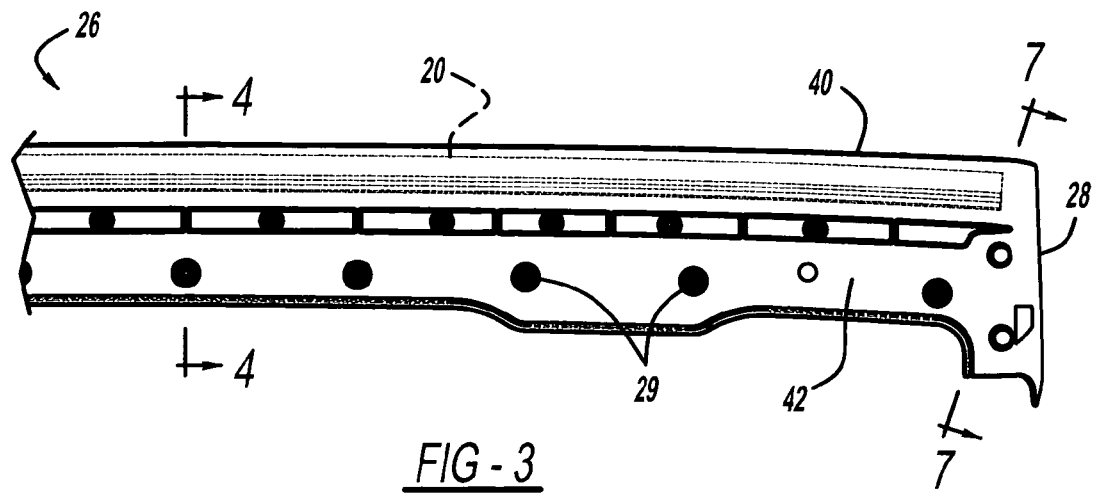
FIG. 3 is a plan view of the serviceable fabric assembly taken along a symmetrical centerline of the serviceable fabric assembly, according to the present invention.
Figure 4:
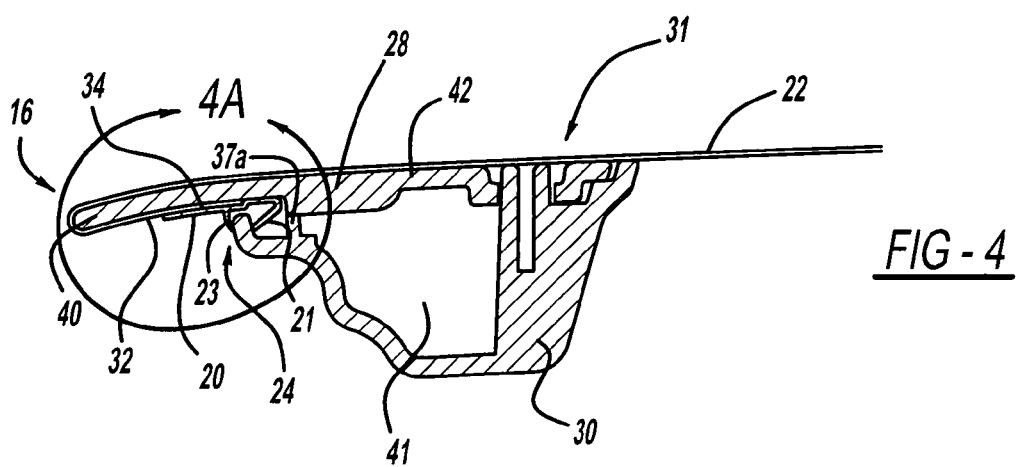
FIG. 4 is a cross sectional plan view of the serviceable fabric assembly taken along line 4-4 of FIG. 3 depicting a fabric cover connected to a retainer which is located within a channel of a first bow member, according to the present invention.
Figure 4A:
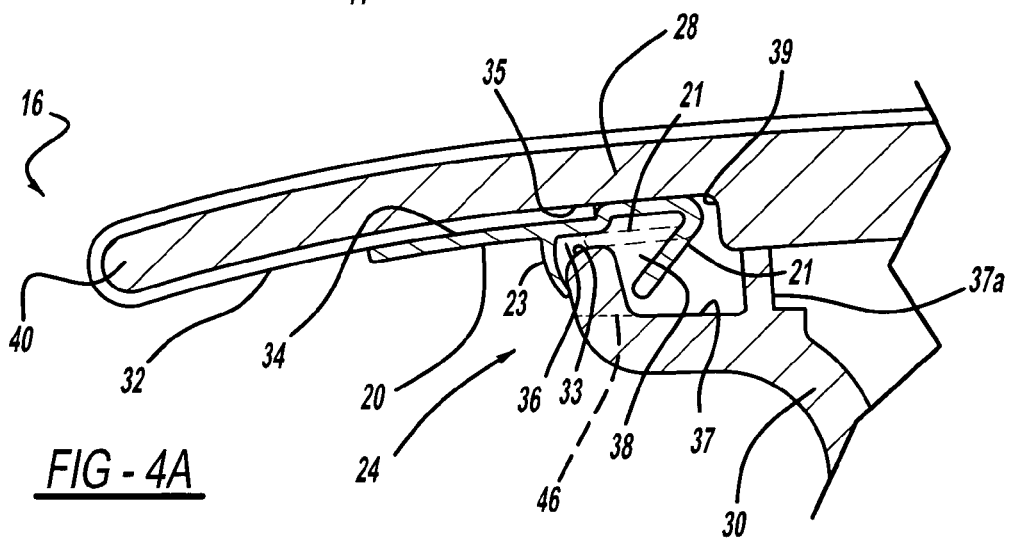
FIG. 4(a) is an enlarged cross sectional plan view of the serviceable fabric assembly of circle 4A of FIG. 4, showing a compressible portion of the retainer in phantom pushed laterally through a narrower opening of the channel and showing the compressible portion of the retainer decompressed within a larger inner cavity of the channel, according to the present invention.

Referring generally to FIGS. 2-7, and specifically to FIGS. 4 and 4(a), a cross sectional plan view of the serviceable fabric assembly 16 shown along line 4-4 of FIG. 3 is depicted. The first bow member 26 is assembled by connecting the upper and lower panels 28,30 together. By way of non-limiting example, a heat staking process is used to securely join or connect a plurality of heat stakes 29 or posts and respective opposing plurality of holes, indicated generally at 31. Opposingly disposed features are operably formed in the upper and lower panels 28,30 to create the channel 24 when the first bow member 26 is assembled. The channel 24 allows the installed retainer 20 to be selectively slid substantially along the longitudinal length of the channel, e.g., substantially parallel to the longitudinal axis of the first bow member 26. It is understood that the depth and the shape of the channel 24 can vary and depends upon the configuration of the retainer 20 with which it must engage. It is further understood that the channel 24 can alternatively be formed solely within either the upper panel 28 or lower panel 30, e.g., formed during injection molding of either the upper or lower panel 28,30, and the like.

The channel 24 generally has a narrower opening 36 followed by a larger inner cavity 38 extending substantially along the entire length of the first bow member 26 operable for receiving and selectively retaining the retainer 20. As shown in FIG. 4A, the narrower opening 36 is generally formed by a terminal end of the lower panel 30 having a first surface, indicated at 33, forming the bottom of the narrower opening 36 and an opposingly disposed second surface, indicated at 35, formed on the underside of the upper panel 28 forming the top of the narrower opening 36. As further shown in FIG. 4A, the larger inner cavity 38 is generally formed by a third surface, indicated generally at 37, and a rib 37a, formed into the lower panel 30, e.g., the third surface 37 and rib 37a forming a substantially u-shape in the lower panel 30, and an opposingly disposed fourth surface, indicated generally at 39, e.g., a substantially L-shaped fourth surface 39 formed in the upper panel 38. The rib 37a is operably formed generally at the back of the larger inner cavity 38, e.g., disposed an operable distance from the narrower opening 36, such that the rib 37a at least partly defines the inward most side or back of the larger inner cavity 38 and the fourth surface 39, e.g., L-shaped, at least partly defines the rest of the inward most side of the larger inner cavity 39. It is understood that one or more alternative surfaces generally disposed on said upper and lower panels 28,30 can be used if suitable to form the narrower opening 36 followed by the larger inner cavity 38.

Referring to FIGS. 4 and 4A, the channel 24 is shaped such that at least part of the retainer 20 can enter laterally through the narrower opening 36 and extend into the larger inner cavity 38. As depicted, the retainer 20 and channel 24 forms a snap-fit type engagement wherein the retainer 20 is pushed laterally through the narrower opening 36 and expands or widens within the larger inner cavity 38. This prevents the retainer 20 from coming laterally out or backing out of the narrower opening 36. FIG. 4A illustrates a compressible portion 21 in phantom being compressed against first surface 33 as the compressed portion 21 is pushed laterally through the narrower opening 36 defined by the first and second surfaces 33,35. FIG. 4A also depicts the compressible portion 21 becoming decompressed when it enters the larger inner cavity 38 from the narrower opening 36. By way of non-limiting example, as depicted in FIGS. 4, 4A, and 6, the compressible portion 21 can be substantially U-shaped and the like.

At least the compressible portion 21 of the retainer 20 is operably formed of a semi-flexible material and is adapted to compress through the narrower opening 36 and expand or open up to at least partly fill the larger inner cavity 38, e.g., formed of semi-flexible extruded, thermoformed, or injection molded plastic, and the like. The retainer 20 can also have an opposingly disposed feature, generally indicated at 23, formed along the retainer 20 substantially opposite to the compressible portion 21 to engage the upper or lower panels 28,30 at a location outside of the narrower opening 36. By way of non-limiting example, the opposingly disposed feature 23 can be shaped as a flange, tab, rib, protrusion and the like. Thus, the retainer 20 is substantially maintained in a fixed lateral and axial position while still allowing the retainer 20 to slide along the longitudinal length of the channel 24 transverse to an axis extending though the narrower opening 36 to the larger inner cavity 38.

Preferably, the fabric cover 22 is connected to the fabric attachment surface 34 of the retainer 20 such that the fabric cover 22 is located between the fabric attachment surface 34 and a generally flat underside portion of the upper panel 28 disposed substantially outside of the narrower opening 36 when the retainer 20 is connected to the channel 24. This configuration can help hold the fabric cover 22 substantially flush with the upper panel 28 without inhibiting sliding of the retainer 20 in the channel 24 when servicing the fabric cover 22 is desired. The fabric cover 22 is preferably connected to the retainer 20 by sewing for connection strength without sacrificing space at the connection location, e.g., to maintain a substantially low profile. The fabric attachment surface 34 is depicted as outside the larger inner cavity 38 of the channel 24, however, it is understood that the fabric attachment surface 34 can alternatively extend at least partly into the larger inner cavity 38 and narrower opening 36. It is further understood that the fabric attachment surface 34 can be any of one or more surfaces on the retainer 20 suitable for securely affixing the fabric cover 22 along the retainer 20 without impeding or interfering with selective sliding of the retainer 20 in the channel 24.

As shown in FIG. 4, when the retainer 20 is installed within the channel 24, the fabric cover 22 substantially overlaps the forward most side 40, shown in FIGS. 2-4(*a*), of the first bow member 26 and substantially covers the top surface 42 of the first bow member 26. Thus, the fabric cover 22 forms part of the convertible roof 12 that is visible to an operator outside the vehicle when the convertible roof 12 is in the up or extended position. The lower panel 30 of the first bow member 26 is at least partly a garnish trim or show surface viewable to an operator within the passenger compartment when the convertible roof 12 is in the up position. It is understood that at least the portion of the lower panel 30 viewable by an operator can contain aesthetic grain, stipple, and the like, or other appealing surface treatment. It is further understood that the overall dimensions and contour of the first bow member 26 are operable to interact with a respective motor vehicle with which it must engage. Accordingly, while a substantially large cavity 41 is depicted in FIG. 4 inboard from the channel 24, e.g., located on the opposite side of the rib 37*a* from the larger inner cavity 38, and formed by the upper and lower panel 28,30, it is understood that the shape and dimensions of the substantially large cavity 41 can vary depending on the motor vehicle with which the first bow member 26 is engaged.

FIGS. 5 and 6 illustrate a perspective view of the lower panel 32 of the first bow member 26 configured to form part of the channel 24 and a gap, indicated at 46, formed substantially near at least one end of the channel 24. The gap 46 is formed on the outboard side of the channel 24 to allow the retainer 20 to be selectively removed from the channel 24 through the gap 46 in a direction generally toward the forward most side 40 of the first bow member 26. FIG. 4A further illustrates the gap 46 location in phantom on the outboard side of the channel 24. The lower panel 32 is depicted with a generally contoured end portion 48 including a terminating end 50 at which the gap 46 terminates to prevent the retainer 20 from sliding past the terminating end 50. Preferably, the gap 46 terminates adjacent to and substantially below the top of the terminating end 50. The gap 46 creates a slot or cut out in the lower panel 30 that is operably sized and shaped so that an operator can manipulate the retainer 20 out of the gap 46. A top surface 52 of the gap 46 is operably located such that a plane passing along the top surface 52 is spaced below a plane passing along the first surface 33 defining the bottom of the narrower opening 36 and below a plane passing along the terminating end 50. An operator can selectively slide or bias the retainer 20 along the channel 24 and out of the channel 24 through the gap 46. This allows removal of the retainer 20 from the channel 24 for servicing and replacing the fabric cover 22 without having to disassemble the first bow member 26. Preferably, as shown in phantom in FIG. 4A, the top surface 52 of the gap 46 substantially eliminates the narrower opening 36 such that the top surface 52 is substantially flush with the bottom of the third surface 37 of the larger inner cavity 38.

FIG. 6 depicts the fabric cover 22 attached along the fabric attachment surface 34 of the retainer 20 and curving generally upward. As further illustrated in FIG. 4, the fabric cover 22 is operably disposed to overlap the forward most side 40 of the first bow member 26 and to substantially cover the top surface 42 of the first bow member 26 to form part of the convertible roof 12 visible to an operator standing outside of the motor vehicle 10.

It is understood that the terminal end of the lower panel 30 having a first surface 33 forming the bottom of the narrower opening 36 can be generally formed as an elongated protrusion, indicated at 44. It is understood that the elongated protrusion 44 can be any other suitable raised shape operable for preventing the retainer 20 from coming laterally out of the channel 24 through the narrower opening 36, e.g., formed as a lip, raised groove, elongated rib, and the like. It is further understood that the elongated protrusion 44 can alternatively be formed on the upper panel 28 of the first bow member 26. The compressible portion 21 is depicted within the lower panel 30 portion of the larger inner cavity 38 and engaging the elongated protrusion 44 to help prevent the compressible portion 21 from coming out through the narrower opening 36. The gap 46 creates a cut out in the elongated protrusion 44 to create room for the retainer 20 to be selectively slid out of the channel through the gap for servicing and replacement of the fabric cover 22 outside of the first bow member 26.

FIG. 7 is a cross sectional plan view of the serviceable fabric assembly taken along line 7-7 of FIG. 3 depicting an example of the gap 46 configured to allow the retainer 20 to be selectively slid out of the gap of the channel 24 for servicing the fabric cover 22, in accordance with one aspect of the present invention.

In another embodiment, the method of assembling the serviceable fabric assembly 16 includes providing the first bow member 26, the retainer 20, and the fabric cover 22. The fabric cover 22 is connected, e.g., sewn, to one or more fabric attachment surfaces 38 on the retainer 20. Assembling the first bow member includes connecting an upper panel 28 to a lower panel 30, e.g., by heat stake. A channel 24, having a narrower opening 36 followed by a larger inner cavity 38, is thereby formed in the assembled first bow member 26. The fabric cover 22 is positioned to substantially cover the top surface 42 of the first bow member 26 and to overlap the forward most side 40 of the first bow member 26 to form part of the convertible roof 12 visible to an operator standing outside of the motor vehicle 10. The retainer 20 is then inserted laterally through the narrower opening 36 and into the larger inner cavity 38. When inserting the retainer 20, the compressible portion 21 compresses against the first surface 33 as it is pushed laterally through the narrower opening 36 defined by the first and second surfaces 33,35. The compressible portion 21 then expands or decompresses within the larger inner cavity 38 to help prevent the retainer 20 from moving laterally back out of through the narrower opening 36.

In yet another embodiment, the method of assembling the serviceable fabric assembly 16 includes providing the first bow member 26, the retainer 20, and the fabric cover 22. The fabric cover 22 is connected, e.g., sewn, to one or more fabric attachment surfaces 38 on the retainer 20. At least the compressible portion 21 of the retainer 20 is placed into the partially formed larger inner cavity 38 of the channel 24 associated with the lower panel 30. The upper panel 28 is then connected, e.g., heat staked, to the lower panel 30 such that the channel 24 is now completely formed by the assembly of the first bow member 26 and the compressible portion 21 of the retainer is trapped within the larger inner cavity 38 of the channel 24. The fabric cover 22 is positioned to overlap the forward most side 40 of the first bow member 26 and to substantially cover the top surface 42 of the first bow member 26 to form part of the convertible roof 12 visible to an operator standing outside of the motor vehicle 10. It is understood that alternatively, at least the compressible portion 21 of the retainer 20 can be placed into the partially formed larger inner cavity 38 of the channel 24 associated with the upper panel 28 prior to connecting the upper panel 28 to the lower panel 30.

In an alternative embodiment, the method of assembling the serviceable fabric assembly 16 includes providing the first bow member 26, the retainer 20, and the fabric cover 22. The fabric cover 22 is connected, e.g., sewn, to one or more fabric attachment surfaces 38 on the retainer 20. Assembling the first bow member includes connecting an upper panel 28 to a lower panel 30, e.g., by heat stake. A channel 24, having a narrower opening 36 followed by a larger inner cavity 38, is formed in the assembled first bow member 26. The compressible portion 21 of the retainer 20 is then aligned with the gap 46 of the channel 24 and the rest of the retainer 20 is adjacent to the narrower opening 36 of the channel. The compressible portion 21 is then inserted through the gap 46. This results in at least the compressible portion 21 of the retainer 20 being disposed within the larger inner cavity 38 of the channel and the rest of the retainer 20 extending through the narrower opening 36. The compressible portion 21 of the retainer 20 is then slid along the channel 24 until the entire compressible portion 21 of the retainer 20 is disposed substantially along the entire longitudinal length of the channel 24 and the rest of the retainer 20, e.g., the fabric attachment surface 34, is disposed outside of the larger inner cavity 38 in association with the narrower opening 36. The fabric cover 22 is positioned to overlap the forward most side 40 of the first bow member 26 and to substantially cover the top surface 42 of the first bow member 26 to form part of the convertible roof 12 visible to an operator standing outside of the motor vehicle 10.

The description of the invention is merely exemplary in nature and thus, variations that do not depart from the gist of the invention are intended to be within the scope of the invention. Such variations are not to be regarded as a departure from the spirit and scope of the invention.

What is claimed is:

1. A serviceable fabric assembly for a convertible roof of a motor vehicle comprising,
   a retainer connected to a fabric cover;
   a first bow member selectively connected to a windshield frame of said motor vehicle;
   a channel formed substantially along a longitudinal length of said first bow member for holding said retainer, said channel including a forward most lateral opening having a narrow portion leading to a larger inner cavity;
   a compressible portion formed on said retainer that compresses to fit laterally through said narrower opening of said channel and expand within said larger inner cavity of said channel to prevent said retainer from coming laterally out through said narrower opening; and
   a gap located near at least one end of said channel for selectively removing said retainer from said channel;
   wherein said retainer is slidably engaged with said channel so that an operator can selectively slide said retainer along said longitudinal length of said channel and out of said gap for servicing and replacing of said fabric cover without dismantling said first bow member.

2. The serviceable fabric assembly of claim 1, wherein said retainer is connected along a front end of said fabric cover.

3. The serviceable fabric assembly of claim 1, wherein said fabric cover is sewn to said retainer to maintain a substantially low profile.

4. The serviceable fabric assembly of claim 1, wherein said fabric cover is connected to one or more fabric attachment surfaces extending substantially along the longitudinal length of said retainer.

5. The serviceable fabric assembly of claim 1, wherein said first bow member further comprises an upper panel connected to a lower panel, wherein said upper and lower panels are operably configured to form said channel.

6. The serviceable fabric assembly of claim 1, wherein said first bow member further comprises an upper panel connected to a lower panel, and wherein said channel is formed in one of said upper and lower panels.

7. The serviceable fabric assembly of claim 1, wherein a plane passing generally along a first surface defining a bottom of said narrower opening is located above an upwardly facing surface of said gap to allow said retainer to selectively slide through said gap and wherein said gap is located below a terminating end of said first bow member to prevent said retainer from sliding past said terminating end.

8. The serviceable fabric assembly of claim 1, further comprising an opposingly disposed feature operably formed substantially opposite to said compressible portion, wherein said opposingly disposed feature and compressible portion grip substantially opposing sides of a lower panel to substantially maintain said retainer in a fixed lateral and axial position within said channel while still allowing the retainer to slide along said longitudinal length of said channel.

9. The serviceable fabric assembly of claim 1, wherein said retainer and said channel form a snap-fit type engagement to prevent said retainer from coming laterally out of said narrower opening.

10. The serviceable fabric assembly of claim 1, wherein said compressible portion is substantially U-shaped to compress to fit laterally through said narrower opening of said channel and expand within said larger inner cavity of said channel to prevent said retainer from coming laterally out of said narrower opening.

11. The serviceable fabric assembly of claim 1, wherein said fabric cover overlaps a forward most side of said first bow member and covers a top surface of said first bow member such that said fabric cover is viewable to an operator standing outside of said motor vehicle when said convertible top is in an up position.

12. A serviceable fabric assembly for a convertible roof of a motor vehicle comprising,
    a retainer connected to a fabric cover,
    a first bow member having an upper panel connected to a lower panel and configured to form a channel that has a narrower opening followed by a larger inner cavity, said channel extending substantially along a longitudinal length of said first bow member and said narrower opening is open in the direction of a forward most side of said first bow member toward a windshield, wherein said first bow member is operably configured to be selectively connected to a windshield frame of said motor vehicle;
    said retainer having a compressible portion that compresses against a first surface forming a bottom of said narrower opening to fit said compressible portion laterally through said narrower opening and into said larger inner cavity, said compressible portion expanding within said larger inner cavity to prevent said compressible portion of said retainer from exiting said channel through said narrower opening;
    an opposingly disposed feature formed on said retainer, wherein said compressible portion and said opposingly disposed feature grip substantially opposing sides of said lower panel to substantially maintained maintain said retainer in a fixed lateral and axial position within said channel while still allowing said retainer to selectively slide along said longitudinal length of said channel; and a gap for selectively removing said retainer from said channel, said gap located near at least one end of said channel, wherein said gap forms a cut out on an outboard side of said channel in the direction of said forward most side of said first bow member;

a contoured end portion formed on said lower panel substantially transverse to said channel and said gap, said contoured end portion including an upwardly disposed terminating end, wherein said gap terminates substantially at said contoured end portion and terminates substantially below said terminating end to prevent said retainer from sliding past said terminating end;

wherein a plane passing along the longitudinal length of said first surface is located above an upwardly facing surface of said gap to allow said retainer to selectively slide through said gap;

wherein said retainer is slidably engaged within said channel so that an operator can slide said retainer along said longitudinal length of said channel and out of said channel through said gap for servicing and replacement of said fabric cover without dismantling said first bow member.

13. The serviceable fabric assembly of claim 12, wherein said retainer is connected to a front end of said fabric cover.

14. The serviceable fabric assembly of claim 12, wherein said fabric cover is sewn to said retainer to maintain a substantially low profile.

15. The serviceable fabric assembly of claim 12, further comprising an elongated protrusion terminating at said narrower opening of said channel to prevent said retainer from coming laterally out of said narrower opening.

16. The serviceable fabric assembly of claim 12, wherein said retainer and said channel form a snap-fit type engagement to prevent said retainer from coming laterally out of said narrower opening.

17. The serviceable fabric assembly of claim 12, wherein said fabric cover overlaps said forward most side of said first bow member and covers a top surface of said first bow member such that said fabric cover is viewable to an operator standing outside of said motor vehicle when said convertible top is in an up position.

18. A method of assembly a serviceable fabric assembly for a convertible roof of a motor vehicle comprising, providing a retainer having a compressible portion and one or more fabric attachment surfaces;

providing a first bow member selectively connected to a windshield frame of said motor vehicle, said first bow member forming a channel extending along the longitudinal length of said first bow member and configured to receive said retainer, said channel including a forward most lateral opening having a narrower opening followed by a larger inner cavity;

providing a gap located near at least one end of said channel operably sized to selectively remove said retainer from said channel;

connecting a fabric cover substantially along the longitudinal length of said one or more fabric attachment surfaces of said retainer;

inserting said retainer into said channel such that said compressible portion is disposed within said larger inner cavity to prevent said retainer from coming laterally out of said channel;

wherein said channel is operably configured to allow an operator to selectively slide said retainer along said longitudinal length of said channel and through said gap of said channel for servicing and replacing of said fabric cover without dismantling said first bow member.

19. The method of assembly a serviceable fabric assembly of claim 18, wherein said retainer is inserted into said channel by compressing said compressible portion against a first surface of a lower panel defining said narrower opening and pushing said compressible portion laterally through said narrower opening into said larger inner cavity where said compressible member expands to prevent said retainer from exiting through said narrower opening.

20. The method of assembly a serviceable fabric assembly of claim 18, wherein said retainer is inserted into said channel by aligning said compressible portion of said retainer with said gap and aligning said fabric attachment surface of said retainer with said narrower opening, inserting said compressible portion through said gap into said larger inner cavity of said channel, and sliding said retainer along said channel until said compressible portion is located entirely within said larger inner cavity.

* * * * *